United States Patent
Takhirov et al.

(10) Patent No.: US 10,682,955 B1
(45) Date of Patent: Jun. 16, 2020

(54) MULTICAMERA SYSTEM FOR AUTONOMOUS DRIVING VEHICLES

(71) Applicant: DiDi Research America, LLC, Mountain View, CA (US)

(72) Inventors: Zafar Takhirov, Santa Clara, CA (US); Sen Hu, Mountain View, CA (US)

(73) Assignee: BEIJING VOYAGER TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/208,483

(22) Filed: Dec. 3, 2018

(51) Int. Cl.
*B60R 1/00* (2006.01)
*H04N 5/247* (2006.01)

(52) U.S. Cl.
CPC ............. *B60R 1/002* (2013.01); *H04N 5/247* (2013.01); *B60R 2300/105* (2013.01); *B60R 2300/107* (2013.01); *B60R 2300/303* (2013.01); *B60R 2300/8093* (2013.01)

(58) Field of Classification Search
CPC ............. B60R 1/002; B60R 2300/105; B60R 2300/107; B60R 2300/303; B60R 2300/8093; H04N 5/247; G06T 2207/30252; G06T 2207/30261; G06T 2207/30264; G06T 2207/30256

USPC ........................................................ 348/148
See application file for complete search history.

(56) References Cited

U.S. PATENT DOCUMENTS

| | | | |
|---|---|---|---|
| 2007/0090311 A1* | 4/2007 | Pallaro | B60Q 1/1423 250/574 |
| 2011/0085789 A1* | 4/2011 | Campbell | G03B 35/00 396/325 |
| 2014/0016016 A1* | 1/2014 | Berestov | H04N 5/23212 348/345 |
| 2014/0111650 A1* | 4/2014 | Georgiev | G06T 3/4038 348/159 |
| 2017/0032197 A1* | 2/2017 | Sim | B60R 11/04 |

* cited by examiner

*Primary Examiner* — Jared Walker
(74) *Attorney, Agent, or Firm* — Bayes PLLC (57) ABSTRACT

Embodiments of the disclosure provide a camera system for a vehicle and a sensing method using such a camera system. The camera system includes a plurality of cameras each configured with a different camera setting. The cameras collectively keep a predetermined image space in focus. The predetermined image space includes at least one object. The camera system further includes a controller. The controller is configured to receive image data captured by the plurality of cameras of the predetermined image space, and determine depth information of the at least one object based on the image data.

20 Claims, 5 Drawing Sheets

MULTICAMERA SYSTEM FOR AUTONOMOUS DRIVING VEHICLES

TECHNICAL FIELD

The present disclosure relates to a camera system for vehicles, and more particularly to, a multicamera system for autonomous driving vehicles.

BACKGROUND

Autonomous driving technology relies on accurate sensing systems. For example, an autonomous driving vehicle may be equipped with multiple integrated sensors such as one or more cameras, a Light Detection And Ranging (LiDAR), a Radio Detection And Ranging (RADAR) sensors, and sonic and ultra sonic sensors, to capture data such as images/videos, point clouds, vehicle pose information, etc. The autonomous driving vehicle then processes the sensed data to learn information that may aid the control of various vehicle functions. For example, cameras may be used to capture surrounding scenes as the vehicle moves. By processing the captured scene images, the vehicle may learn the objects surrounding it and how far they are. For instance, if the vehicle detects that a pedestrian is about 10 feet in front it, it will control the braking system to apply an emergency braking to stop the vehicle.

However, cameras sensing in the context autonomous driving is challenging. Known problems include e.g., photographic artifacts, overfit field-of-view, aperture, and other camera settings. For example, some of the photographic problems may be lens flares caused by bright light sources. Others may be green rays or "ghosts" caused by self-reflection in a lens. Other problems may include discolorations or over-/under-bright images caused by the CMOS settings. In addition, a single monocular camera can only capture two-dimensional (2D) images but cannot provide depth information of an object. However, depth information is usually critical to autonomous driving vehicles. Although more sophisticated cameras, such as a binocular camera, can provide depth information, they are typically more expensive and therefore increase the cost of the vehicle. Therefore, an improved system for sensing data is needed.

Embodiments of the disclosure address the above problems by a multicamera system.

SUMMARY

Embodiments of the disclosure provide a camera system for a vehicle. The camera system includes a plurality of cameras each configured with a different camera setting. The cameras collectively keep a predetermined image space in focus. The predetermined image space includes at least one object. The camera system further includes a controller. The controller is configured to receive image data captured by the plurality of cameras of the predetermined image space, and determine depth information of the at least one object based on the image data.

Embodiments of the disclosure also provide a vehicle. The vehicle includes a body and at least one wheel. The vehicle also includes a plurality of cameras equipped on the body and configured with a different camera setting. The cameras collectively keep a predetermined image space in focus. The predetermined image space includes at least one object. The vehicle further includes a controller. The controller is configured to receive image data captured by the plurality of cameras of the predetermined image space, determine depth information of the at least one object based on the image data, and control at least one function of the vehicle based on the depth information.

Embodiments of the disclosure further provide a sensing method. The sensing includes capturing image data of a predetermined image space including at least one object using a plurality of cameras. Each camera is configured with a different camera setting, and the cameras collectively keep a predetermined image space in focus. The sensing method further includes determining depth information of the at least one object based on the image data.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Figure 1:
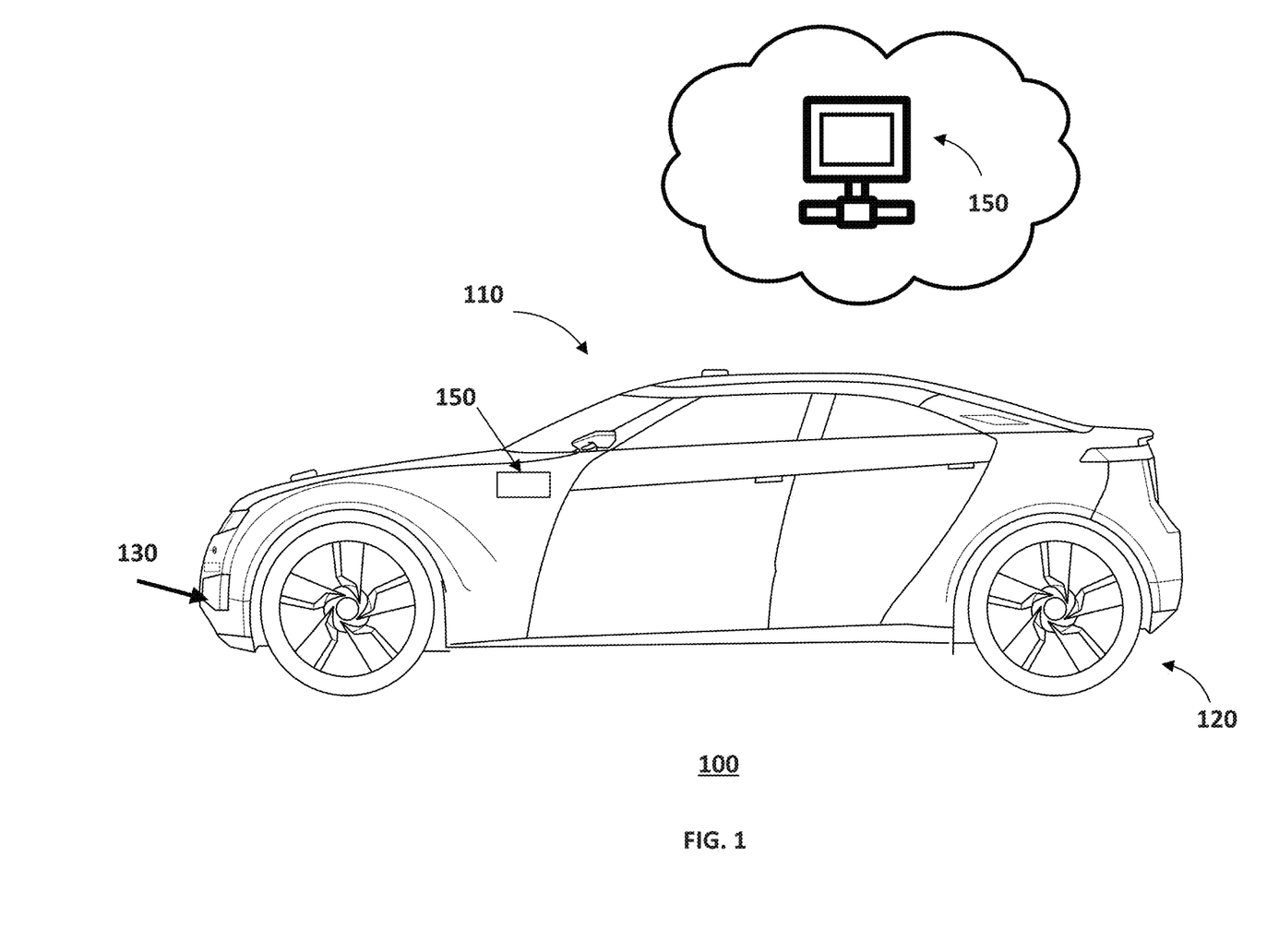
FIG. 1 illustrates a schematic diagram of an exemplary vehicle equipped with a camera system, according to embodiments of the disclosure.

FIG. 1 illustrates a schematic diagram of an exemplary vehicle 100 equipped with a camera system, according to embodiments of the disclosure. Consistent with some embodiments, vehicle 100 may be configured to be operated by an operator occupying the vehicle, remotely controlled, and/or autonomous. It is contemplated that vehicle 100 may be an electric vehicle, a fuel cell vehicle, a hybrid vehicle, or a conventional internal combustion engine vehicle. Vehicle 100 may have a body 110 and at least one wheel 120. Body 110 may be any body style, such as a sports vehicle, a coupe, a sedan, a pick-up truck, a station wagon, a sports utility vehicle (SUV), a minivan, or a conversion van. In some embodiments, vehicle 100 may include a pair of front wheels and a pair of rear wheels, as illustrated in FIG. 1. However, it is contemplated that vehicle 100 may have more or less wheels or equivalent structures that enable vehicle 100 to move around. Vehicle 100 may be configured to be all wheel drive (AWD), front wheel drive (FWR), or rear wheel drive (RWD).

As illustrated in FIG. 1, vehicle 100 may be equipped with a camera system, including, among other things, multiple cameras 130 and a controller 150. Cameras 130 may be mounted or otherwise installed on or inside body 110. In some embodiments, cameras 130 may be configured to capture data as vehicle 100 travels along a trajectory. Consistent with the present disclosure, cameras 130 may be configured to take pictures or videos of the surrounding. For example, the cameras may be monocular or binocular cameras. As vehicle 100 travels along the trajectory, cameras 130 may continuously capture data. Each set of scene data captured at a certain time point is known as a data frame. For example, cameras 130 may record a video consisting of multiple image frames captured at multiple time points.

Consistent with the present disclosure, cameras 130 may include cameras configured with different camera settings. In some embodiments, each camera may have a different focal length, or angle of view. Collectively, the multiple cameras may keep the relevant image space in focus and would mitigate the artifacts introduced by lens imperfections. For example, cameras 130 may include cameras with focal lengths at 1 m, 5 m, 10 m, 20 m, and 30 m, etc. Therefore, a particular camera may cover a preset depth range and objects within the respective depth range may be in focus with that camera. As a result, the entire image space within 30 m of cameras 130 may be in focus, and covered by cameras 130 collectively.

Figure 2:
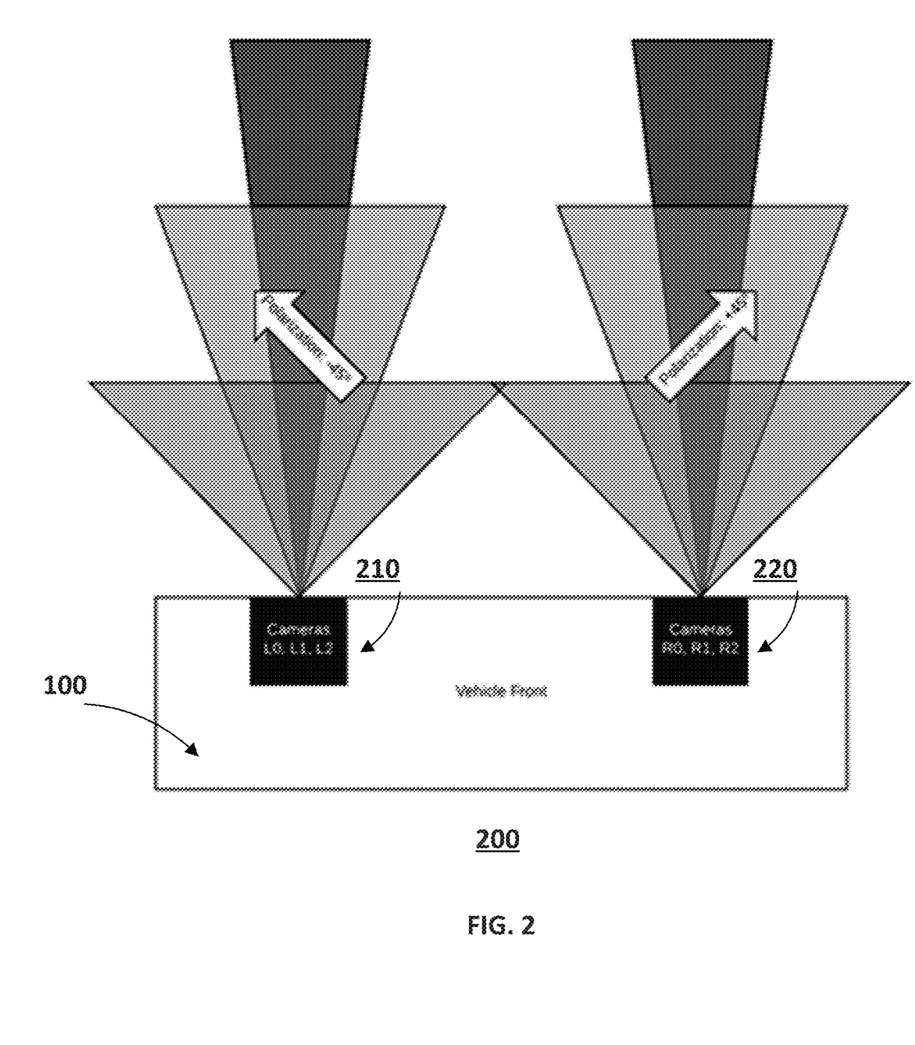
FIG. 2 illustrates a schematic diagram of cameras in an exemplary camera system, according to embodiments of the disclosure.

In some embodiments, multiple cameras 130 may be all installed at the same location on body 110 or be divided into groups and installed at different locations on body 110. For example, FIG. 2 illustrates a schematic diagram of cameras 200 in an exemplary camera system, according to embodiments of the disclosure. As shown in FIG. 2, cameras 200 may include a total of 6 front-facing cameras installed at the front of vehicle 100. The 6 front-facing cameras may be divided into two groups, including 3 left cameras 210 (L0, L1, and L2) and 3 right cameras 220 (R0, R1, and R2). It is contemplated that more or less groups of cameras and/or more or less cameras within each group may be used than those shown in FIG. 2.

In some embodiments, cameras within each group may be configured with different focal lengths, and accordingly, angles of view. Consistent with this disclosure, a "focal length" refers to the distance between the camera lens and the image sensor when a subject is in focus. The focal length is usually determined by the type of lens used (normal, long focus, wide angle, telephoto, macro, fisheye, or zoom). The focal length is usually stated in millimeters (e.g., 28 mm, 50 mm, or 100 mm). Consistent with this disclosure, an "angle of view" of a camera is the visible extent of the scene captured by the image sensor, stated as an angle. A wide angle of view captures a greater area, and a small angle captures a smaller area.

It is well-known in the art that a camera's angle of view reduces as its focal length is increased. Changing the focal length changes the angle of view. The shorter the focal length, the wider the angle of view and the greater the area captured. For example, at a nominal focal length (known as fisheye), a camera can capture image data in an angle of view close to 180 degrees. The longer the focal length is, the smaller the angle and the larger the subject appears to be. Lenses with a wide picture angle are referred to as wide-angle lenses, lenses with a small picture angle as telephoto lenses.

In some embodiments, the [focal length, angle of view] pairs of an exemplary camera are listed in Table 1 below:

TABLE 1

| FL (mm) | 14 | 20 | 24 | 28 | 35 | 50 | 70 | 80 |
|---|---|---|---|---|---|---|---|---|
| AoV | 114° | 94° | 84° | 75° | 63° | 46° | 34° | 30° |
| FL (mm) | 85 | 100 | 135 | 200 | 300 | 400 | 500 | |
| AoV | 28° | 24° | 18° | 12° | 8° | 6° | 5° | |

In some embodiments, each of left cameras 210, i.e., L0, L1, or L2 is configured with a different focal length. For example, cameras L0, L1, and L2 may be set with focal lengths of 28 mm, 70 mm, and 100 mm, respectively. Accordingly, the angle of views of cameras L0, L1, and L2 will be 75°, 34°, and 24°, respectively. It is contemplated that the cameras can be configured with other focal lengths. By using such settings, cameras 200 may keep the entire image space in front of vehicle 100 in focus. It is contemplated that different optical settings or lenses other than focal lengths could be used.

In some embodiments, left cameras 210 and right cameras 220 may have orthogonal polarization. For example, left cameras 210 may have a polarization of −45 degrees, when right cameras 220 may have a polarization of +45 degrees. The polarizations are 90 degrees apart and thus orthogonal with each other. Using orthogonal polarization between the two sets of cameras enables cameras 200 to collectively cover a wider field of view. Although 45-degree polarizations are illustrated in FIG. 2, it is contemplated that the polarization could be any other angle off each other set based on environmental conditions. In the event that N (N>2) groups of cameras are used, in some embodiments, the polarizations of the different groups of cameras may be set to be 180°/N apart. For example, if there are three groups of cameras, a polarization scheme of 0°, 60°, 120° polarization, respectively, may be used.

Returning to FIG. 1, in some embodiments, cameras 130 may communicate with a controller 150. In some embodiments, controller 150 may be a controller onboard of vehicle 100, e.g., the electronic control unit. In some embodiments, controller 150 may be part of a local physical server, a cloud server (as illustrated in FIG. 1), a virtual server, a distributed server, or any other suitable computing device. Controller 150 may communicate with cameras 130, and/or other components of vehicle 100 via a network, such as a Wireless Local Area Network (WLAN), a Wide Area Network (WAN), wireless networks such as radio waves, a cellular network, a satellite communication network, and/or a local or short-range wireless network (e.g., Bluetooth™).

Consistent with the present disclosure, controller 150 may be responsible for processing image data captured by cameras 130 and performing vehicle functions based on the image data. Due to the redundancy offered by cameras 130, controller 150 can estimate depth information of an object within the image space based on the image data captured by cameras 130 using a combination of algorithms that are otherwise not possible to use. In some embodiments, controller 150 can estimate the distance to a point on a 2D projected image by identifying which of cameras 130 are in focus, and use that information to infer the distance.

Figure 3:
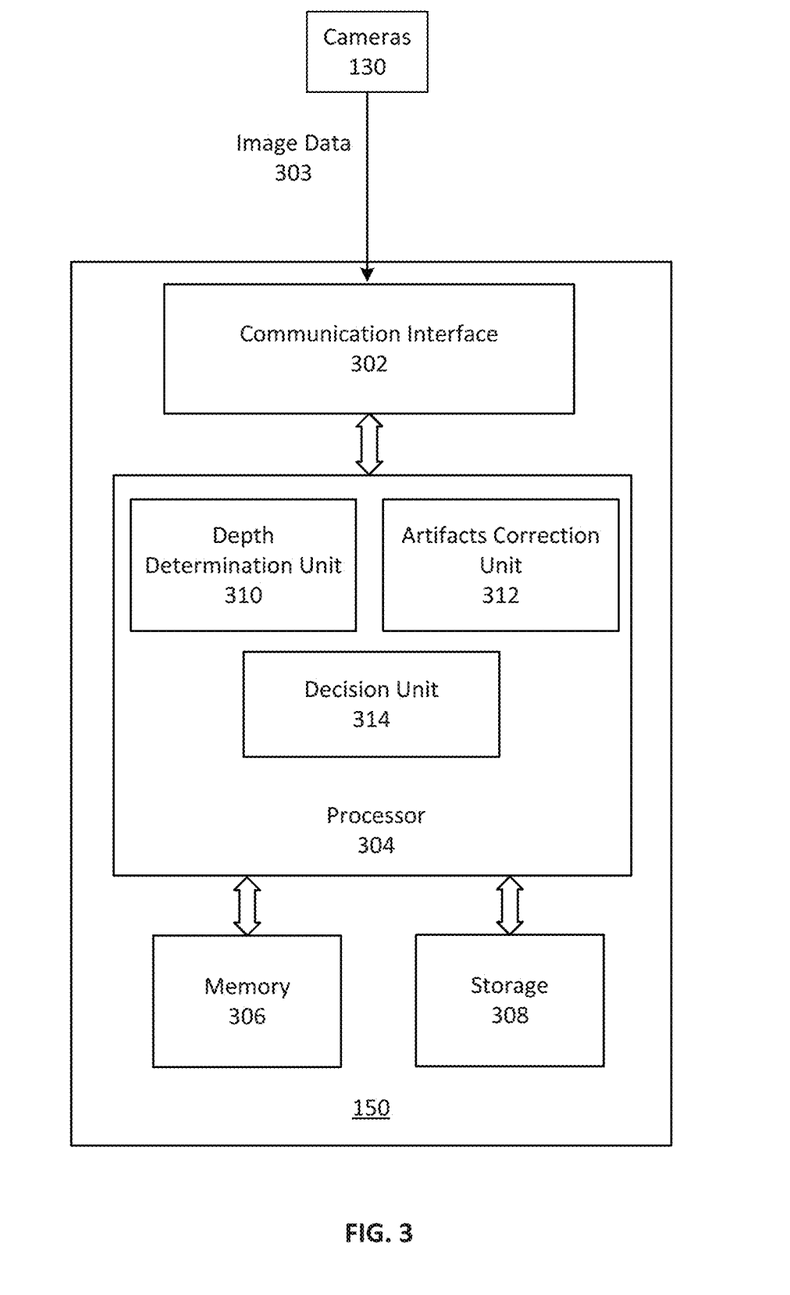
FIG. 3 illustrates a block diagram of an exemplary camera system, according to embodiments of the disclosure.

For example, FIG. 3 illustrates a block diagram of an exemplary controller 150, according to embodiments of the disclosure. Consistent with the present disclosure, controller 150 may receive image data 303 from cameras 130. Controller 150 may estimate depth of an object using image data 303, correct artifacts in image data 303, and/or make vehicle control decisions based on image data 303.

In some embodiments, as shown in FIG. 3, controller 150 includes a communication interface 302, a processor 304, a memory 306, and a storage 308. In some embodiments, controller 150 includes different modules in a single device, such as an integrated circuit (IC) chip (implemented as an application-specific integrated circuit (ASIC) or a field-programmable gate array (FPGA)), or separate devices with dedicated functions. In some embodiments, one or more components of controller 150 may be located in a cloud, or may be alternatively in a single location (such as inside vehicle 100 or a mobile device) or distributed locations. Components of controller 150 may be in an integrated device, or distributed at different locations but communicate with each other through a network (not shown).

Communication interface 302 may send data to and receive data from components such as cameras 130 via communication cables, a Wireless Local Area Network (WLAN), a Wide Area Network (WAN), wireless networks such as radio waves, a cellular network, and/or a local or short-range wireless network (e.g., Bluetooth™), or other communication methods. In some embodiments, communication interface 302 can be an integrated services digital network (ISDN) card, cable modem, satellite modem, or a modem to provide a data communication connection. As another example, communication interface 302 can be a local area network (LAN) card to provide a data communication connection to a compatible LAN. Wireless links can also be implemented by communication interface 302. In such an implementation, communication interface 302 can send and receive electrical, electromagnetic or optical signals that carry digital data streams representing various types of information via a network.

Consistent with some embodiments, communication interface 302 may receive image data 303 captured by cameras 130. Communication interface 302 may further provide the received data to storage 308 for storage or to processor 304 for processing.

Processor 304 may include any appropriate type of general-purpose or special-purpose microprocessor, digital signal processor, or microcontroller. Processor 304 may be configured as a separate processor module dedicated to performing vehicle functions based on image data captured by cameras 130. Alternatively, processor 304 may be configured as a shared processor module for performing other functions.

As shown in FIG. 3, processor 304 includes multiple modules, such as a depth estimation unit 310, an artifacts correction unit 312, and a decision unit 314, and the like. These modules (and any corresponding sub-modules or sub-units) can be hardware units (e.g., portions of an integrated circuit) of processor 304 designed for use with other components or software units implemented by processor 304 through executing at least part of a program. The program may be stored on a computer-readable medium, and when executed by processor 304, it may perform one or more functions. Although FIG. 3 shows units 310-314 all within one processor 304, it is contemplated that these units may be distributed among multiple processors located near or remotely with each other.

Depth estimation unit 310 is configured to estimate the distances between cameras 130 and the objects. In some embodiments, depth estimation unit 310 uses multiple focused images from real aperture cameras to estimate the depth of the scene from cameras 130 (referred to as a "depth-from-focus" method). Alternatively, depth estimation unit 310 can also use multiple defocused images from the real aperture cameras to estimate the depth (referred to as a "depth-from-defocus" method). Real aperture cameras have a relatively short depth of field and, resulting in images which appear focused only on a small 3D slice of the scene.

Figure 4:
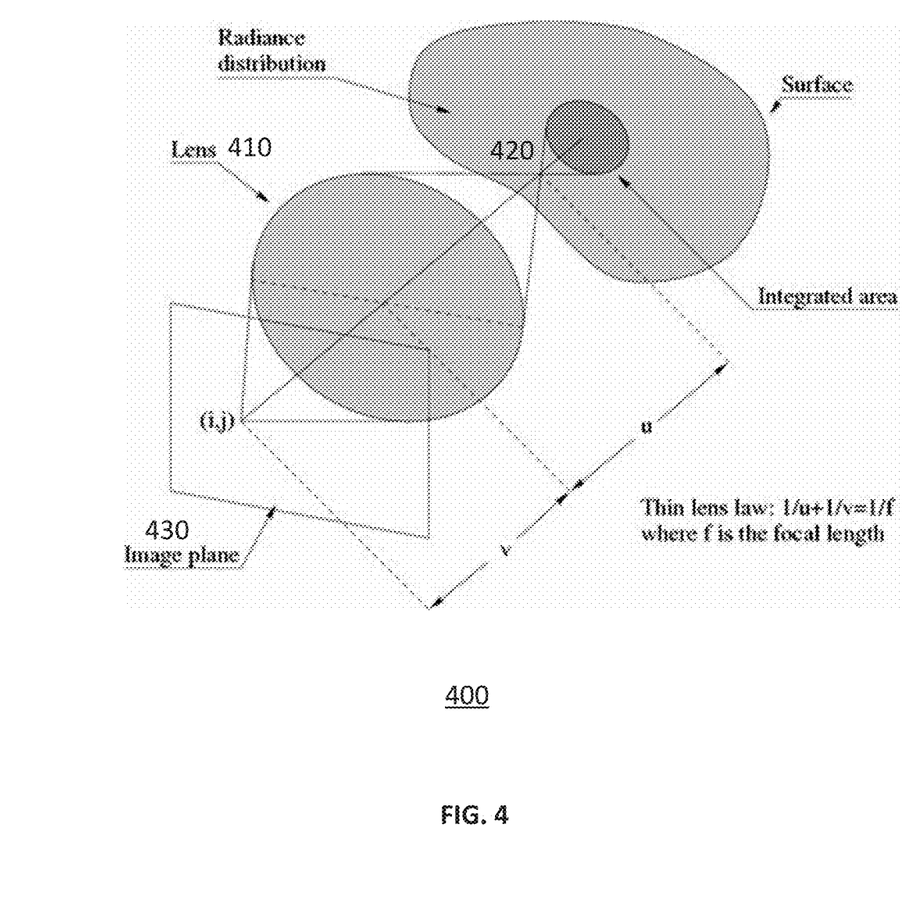
FIG. 4 illustrates an exemplary "depth-from-focus" method, according to embodiments of the disclosure.

FIG. 4 illustrates an exemplary "depth-from-focus" method, according to embodiments of the disclosure. The method will be explained using an optical geometry 400. The lens of each camera 130 is modeled via the thin lens law:

$$1/f = 1/v + 1/u \quad (1)$$

where f is the focal length of camera 130, u is the distance between lens plane 410 and the object in focus 420, and v is the distance from lens plane 410 to the image plane 430. Based on Equation (1), the distance to focused object u can be determined using Equation (2):

$$u = 1 \Big/ \left( \frac{1}{f} - \frac{1}{v} \right) \quad (2)$$

By using multiple cameras 130 with different focal lengths $f_1, f_2, \ldots, f_n$ pointing at the same scene, a set of distances $u_1, \ldots, u_n$ between the focused scenes and n different cameras can be obtained using Equation (3):

$$\begin{cases} u_1 = 1 \Big/ \left( \frac{1}{f_1} - \frac{1}{v} \right) \\ \phantom{u_1} \ddots \\ u_n = 1 \Big/ \left( \frac{1}{f_n} - \frac{1}{v_n} \right) \end{cases} \quad (3)$$

where, and $\{f_1, \ldots f_n, v_1, \ldots, v_n\}$ are parameters for the respective cameras. By determining which object is in focus in which camera (e.g., camera i), the distance of the object to the camera can be estimated as the respective distance $u_i$.

Referring back to FIG. 3, depth estimation unit 310 may determine, for each object in the image space, the camera (e.g., camera i) in which the object is in focus. The determination may be performed, e.g., through image processing methods. Depth estimation unit 310 may then determine the distance to the object as the distance $u_i$ of the camera in focus. In some embodiments, the object may be in focus in more than one cameras (e.g., cameras i and j). Accordingly, the distance to the object may be determined as within a range of $u_i$–$u_j$.

For example, cameras 130 may include 3 real aperture cameras pointing at 3 objects. Depth estimation unit 310 may first determine the distances to focus of the 3 cameras are 20, 40, and 60 meters. Depth estimation unit 310 may then determine in which camera(s) each object is in focus. Table 2 summarizes the information obtained.

TABLE 2

| Focus distance | | Object is in focus? | | |
| --- | --- | --- | --- | --- |
| u (m) | Camera | Object 1 | Object 2 | Object 3 |
| 20 | Camera 1 | Yes | No | No |
| 40 | Camera 2 | No | Yes | No |
| 60 | Camera 3 | No | Yes | Yes |

Based on Table 2, depth estimation unit 310 may estimate the distances to objects. For example, object 1 is about 20 meters, object 2 is about 40-60 meters, and object 3 is about 60 meters away from the cameras.

In some embodiments, when cameras 130 are set up to locate at different locations, such as in FIG. 2, the image data captured becomes stereoscopic images that provide a stereo vision. Depth estimation unit 310 can use the stereoscopic images to further improve the distance estimation by using simple geometry. In some embodiments, e.g., left cameras 210 and right cameras 220 capture images of the same object/scene from two vantage points. Depth estimation unit 310 can extract three-dimensional (3D) information by examining the relative positions of the object in the two images. In other words, a left camera and a right camera may collectively act as a binocular camera. Depth estimation unit 310 may compare the two images, and determine the relative depth information in the form of a disparity map. A disparity map encodes the difference in horizontal coordinates of corresponding image points. The values in this disparity map are inversely proportional to the scene depth at the corresponding pixel location. Therefore, depth estimation unit 310 may determine additional depth information using the disparity map.

Artifacts correction unit 312 may be configured to correct artifacts in image data 303. The image data captured by the cameras may contain artifacts caused by the lens properties, such as lens flares caused by bright light sources, green rays or "ghosts" caused by self-reflection in a lens. The image data may additionally or alternatively contain other artifacts such as discolorations or over-bright/under-bright images caused by the CMOS settings. Artifacts correction unit 312 may correct the artifacts using methods taking advantage of the redundancy provided by the multiple cameras. For example, the images taken by the different cameras may be averaged or otherwise aggregated to remove or reduce an artifact.

Decision unit 314 may make vehicle control decisions based on the processed image data. For example, decision unit 314 may make autonomous driving decisions, e.g., to avoid objects, based on the estimated distances of the objects. Examples of autonomous driving decisions include: accelerating, braking, changing lanes, changing driving directions, etc. For example, if a pedestrian is detected at 20 meters from vehicle 100, decision unit 314 may automatically apply braking immediately. If a pedestrian is detected only 10 meters away and in the direction that vehicle 100 is moving towards, decision unit 314 may steer vehicle 100 away from pedestrian.

Memory 306 and storage 308 may include any appropriate type of mass storage provided to store any type of information that processor 304 may need to operate. Memory 306 and storage 308 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. Memory 306 and/or storage 308 may be configured to store one or more computer programs that may be executed by processor 304 to perform image data processing and vehicle control functions disclosed herein. For example, memory 306 and/or storage 308 may be configured to store program(s) that may be executed by processor 304 to estimate depth information or otherwise make vehicle control functions based on the captured image data.

Memory 306 and/or storage 308 may be further configured to store information and data used by processor 304. For instance, memory 306 and/or storage 308 may be configured to store the various types of data (e.g., image data) captured by cameras 130 and data related to camera setting. Memory 306 and/or storage 308 may also store intermediate data such as the estimated depths by depth estimation unit 310. The various types of data may be stored permanently, removed periodically, or disregarded immediately after each frame of data is processed.

Figure 5:
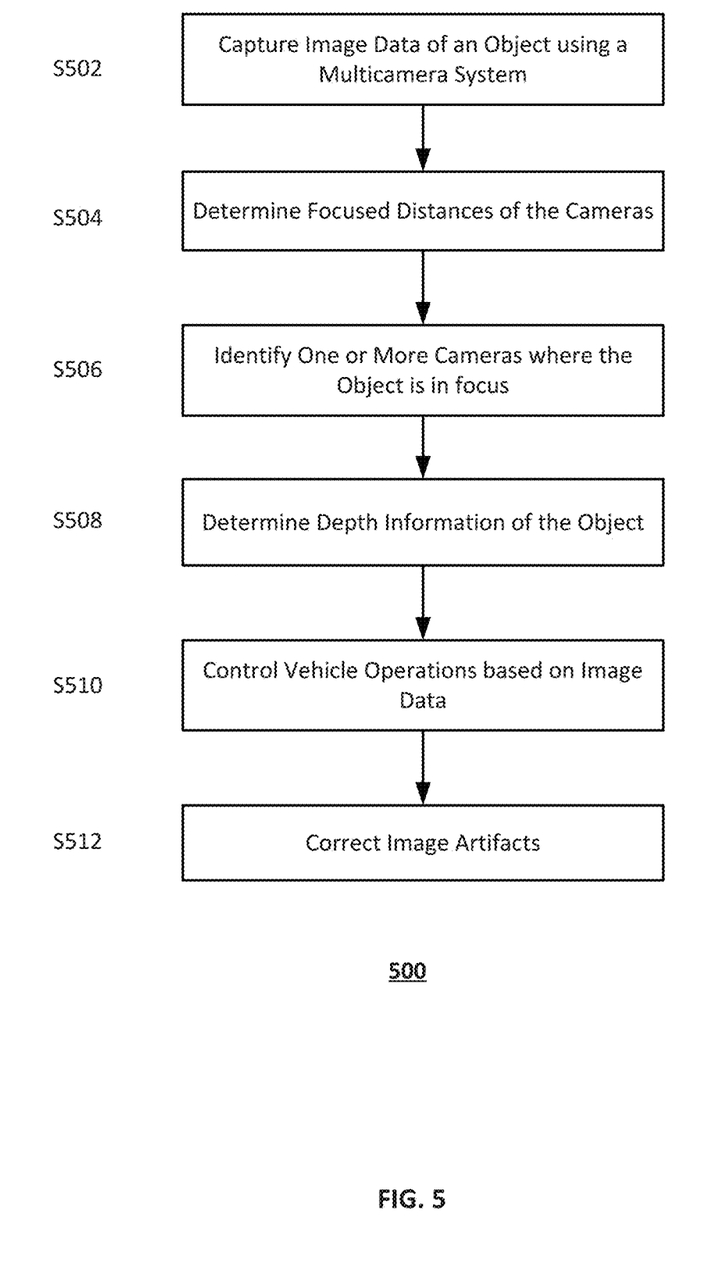
FIG. 5 illustrates a flowchart of an exemplary method performed by a camera system, according to embodiments of the disclosure.

FIG. 5 illustrates a flowchart of an exemplary method 500 performed by a camera system, according to embodiments of the disclosure. In some embodiments, method 500 may be implemented by controller 150 that includes, among other things, processor 304. However, method 500 is not limited to that exemplary embodiment. Method 500 may include steps S502-S512 as described below. It is to be appreciated that some of the steps may be optional to perform the disclosure provided herein. Further, some of the steps may be performed simultaneously, or in a different order than shown in FIG. 5.

In step S502, cameras 130 captures image data of at least one object within a predetermined image space. In some embodiments, the predetermined image space may be a 3D scene within a certain distance of cameras 130 in the direction cameras 130 are pointing to. For example, when cameras 130 are front-facing cameras installed at the front of vehicle 100, the predetermined image space may be the 3D space within, e.g., 60 meters, in front of vehicle 100. In some embodiments, the object may be another vehicle, a motorcycle, a bicycle, a pedestrian, a building, a tree, a traffic sign, a traffic light, etc. One or more objects may be in the predetermined image space.

In some embodiments, cameras 130 may be configured with different focal lengths. Cameras 130 may point to and take images of the same 3D scene, simultaneously or sequentially. The image data captured by cameras 130 may be transmitted to controller 150, e.g., via a network. The one or more objects, depending on their distances from cameras 130, maybe in focus in images taken by one or more cameras 130. For example, if an object is about 10 meters away, it will be in focus in the images taken by a camera with a focused distance of 10 meters.

In some embodiments, when cameras 130 are in a stereo setting, e.g., as shown in FIG. 2, the image data captured in step S502 may include stereoscopic images. The cameras may be divided into two or more groups (e.g., N groups) and placed at different locations of vehicle 100. In some embodiments, the $i^{th}$ group of cameras may be configured to have an $i*180°/N$ polarization.

In step S504, controller 150 determines the focused distance of each camera 130. Parameters and settings of cameras 130 may be pre-stored in controller 150 or provided by cameras 130 along with the image data. Camera parameters and settings may include, among other things, local length, angle of view, aperture, shutter speed, white balance, metering, and filters, etc. The focal length is usually determined by the type of lens used (normal, long focus, wide angle, telephoto, macro, fisheye, or zoom). Camera parameters may also include, e.g., a distance v between the camera's lens plane (e.g., 410 in FIG. 4) and the image plane (e.g., 430 in FIG. 4). Controller 150 determines the focused distance u for each camera based on its focal length f and the distance v, e.g., according to Equation (2).

In step S506, controller 150 identifies one or more cameras in which the object is in focus. In some embodiments, the determination may be performed, e.g., through image processing methods. In step S508, controller 150 determines depth information of the object. In some embodiments, controller 150 determines the distance between cameras 130 and the object. The distance may be estimated using the distance $u_i$ of camera i identified in step S506. In some embodiments, the object may be in focus in more than one cameras (e.g., cameras i and j). Accordingly, the distance to the object may be determined as within a range of $u_i$–$u_j$.

In some embodiments, when cameras 130 are in a stereo setting, e.g., as shown in FIG. 2, controller 150 may derive additional depth information from the stereoscopic images captured by the cameras. For example, controller 150 can determine the relative depth information of the object in the for a of a disparity map that encodes the difference in horizontal coordinates of corresponding image points. Controller 150 can calculate the scene distance based on the inverse relationship between the values in this disparity map and the depths at corresponding pixel location.

In step S510, controller 150 controls vehicle operations based on the image data. For example, controller 150 may make autonomous driving decisions, such as accelerating, braking, changing lanes, changing driving directions, etc. For example, controller 150 may make control decisions to avoid objects, based on the estimated distances of the objects. For instance, when an object (e.g., a pedestrian) is detected at a distance that still allows vehicle 100 to fully stop before colliding with it, controller 150 may control vehicle 100 to brake. Controller 150 may determine the braking force applied in order for vehicle 100 to stop within the estimated distance to the object. If the detected distance of the object no longer allows vehicle 100 to fully stop, controller 150 may steer vehicle 100 away from the direction it is moving towards, in addition or alternative to braking.

In step S512, controller 150 corrects artifacts in the image data captured by cameras 130 using the redundancy provided by the disclosed camera system. In some embodiments, the artifacts may be caused by lens and/or CMOS settings. Controller 150 may correct the artifacts by, e.g., averaging image taken by the different cameras to improve signal-to-noise (SNR) ratio. Controller 150 may also use machine learning based methods to correct the artifacts.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A camera system for a vehicle, comprising:
 a plurality of cameras each configured with a different camera setting, collectively keeping a predetermined image space in focus, wherein the predetermined image space includes at least one object, wherein the predetermined image space is defined relative to the vehicle and wherein the plurality of cameras are located at a plurality of different positions on the vehicle; and
 a controller, configured to:
  receive image data captured by the plurality of cameras of the predetermined image space; and
  determine depth information of the at least one object based on the image data, wherein the depth information comprises a position of the at least one object relative to the vehicle.

2. The system of claim 1, wherein the vehicle is an autonomous driving vehicle, and wherein the controller is further configured to make an autonomous driving decision based on the image data.

3. The system of claim 1, wherein each camera is configured with a different focal length.

4. The system of claim 3, wherein the controller is configured to:
 determine focused distances of the plurality of cameras, based on focal lengths of the cameras;
 identify at least one camera, among the plurality of cameras, in which an object of the at least one object is in focus; and
 determine the depth information of the object based on the focused distance of the identified camera.

5. The system of claim 1, wherein each camera is configured with a different angle of view.

6. The system of claim 1, wherein the plurality of cameras include two sets of cameras, each set of cameras at a different location of the vehicle.

7. The system of claim 6, wherein the two sets of cameras are configured with orthogonal polarization.

8. The system of claim 1, wherein the plurality of cameras include a first camera and a second camera, wherein the controller is further configured to correct artifacts in image data captured by the first camera using image data captured by the second camera.

9. The system of claim 1, wherein the plurality of cameras are configured to point to a same direction.

10. A vehicle, comprising:
 a body;
 at least one wheel;
 a plurality of cameras equipped on the body and configured with a different camera setting, collectively keeping a predetermined image space in focus, wherein the predetermined image space includes at least one object, wherein the predetermined image space is defined relative to the vehicle, and wherein the plurality of cameras are located at a plurality of different positions on the vehicle; and
 a controller, configured to:
  receive image data captured by the plurality of cameras of the predetermined image space;
  determine depth information of the at least one object based on the image data, wherein the depth information comprises a position of the at least one object relative to the vehicle; and
  control at least one function of the vehicle based on the depth information.

11. The vehicle of claim 10, wherein the vehicle is an autonomous driving vehicle, and wherein the controller is further configured to make an autonomous driving decision based on the image data.

12. The vehicle of claim 10, wherein each camera is configured with a different focal length.

13. The vehicle of claim 12, wherein the controller is configured to:
 determine the focused distances of the plurality of cameras, based on focal lengths of the cameras;

identify at least one camera, among the plurality of cameras, in which an object of the at least one object is in focus; and determine the depth information of the object based on the focused distance of the identified camera.

14. The vehicle of claim 10, wherein each camera is configured with a different angle of view.

15. The vehicle of claim 10, wherein the plurality of cameras include two sets of cameras, each set of cameras at a different location of the vehicle, wherein the two sets of cameras are configured with orthogonal polarization.

16. A sensing method, comprising:

capturing image data of a predetermined image space including at least one object using a plurality of cameras each configured with a different camera setting, collectively keeping a predetermined image space in focus, wherein the predetermined image space is defined relative to a vehicle and wherein the plurality of cameras are located at a plurality of different positions on the vehicle; and determining, by at least one processor, depth information of the at least one object based on the image data, wherein the depth information comprises a position of the at least one object relative to the vehicle.

17. The sensing method of claim 16, wherein the vehicle comprises an autonomous driving vehicle on which the plurality of cameras are equipped, and the method further includes:

making an autonomous driving decision based on the image data.

18. The sensing method of claim 16, wherein each camera is configured with a different focal length, and wherein determining depth information further includes:

determining the focused distances of the plurality of cameras, based on focal lengths of the cameras;

identifying at least one camera, among the plurality of cameras, in which an object of the at least one object is in focus; and determining the depth information of the object based on the focused distance of the identified camera.

19. The sensing method of claim 16, wherein the plurality of cameras include a first camera and a second camera, wherein the method further includes:

correcting artifacts in image data captured by the first camera using image data captured by the second camera.

20. The sensing method of claim 16, wherein each camera is configured with a different angle of view.

* * * * *